FREQUENCY CORRECTOR FOR USE IN A DATA TRANSMISSION SYSTEM

Filed July 24, 1964 2 Sheets-Sheet 1

INVENTORS
ROBERT R. HAILEY
GEORGE J. LAURER
ROBERT J. SIMPSON

BY Ronald J. Clark
ATTORNEY

FREQUENCY CORRECTOR FOR USE IN A DATA TRANSMISSION SYSTEM

Filed July 24, 1964 2 Sheets-Sheet 2

United States Patent Office 3,404,230
Patented Oct. 1, 1968

3,404,230
FREQUENCY CORRECTOR FOR USE IN A DATA TRANSMISSION SYSTEM

Robert R. Hailey, Endicott, George J. Laurer, Endwell, and Robert J. Simpson, Owego, N.Y., assignors to International Business Machines Corporation, New York, N.Y., a corporation of New York
Filed July 24, 1964, Ser. No. 384,863
10 Claims. (Cl. 178—69.5)

ABSTRACT OF THE DISCLOSURE

This system provides for adjustment of a local oscillator to hold it in synchronism with a master oscillator. A phase comparator generates a signal indicating the direction of the correction needed to restore synchronism. Pulses from the phase comparator increase or decrease the value in a counter. When the limits of the counter are reached, an elapsed timer is set to energize a motor for a predetermined time period. The motor is connected to a tuning impedance associated with the local oscillator and is driven in a direction to restore synchronism between the master oscillator and the local oscillator.

This invention relates to frequency correction systems and more particularly, to a control circuit for making precise frequency adjustments to the output of a crystal oscillator.

C. R. Coty, Sr. et al. in their application entitled "Incremental Magnetic Tape Terminal," Ser. No. 051,956, filed Aug. 25, 1960, now Patent No. 3,208,049, have described a data transmission system for providing a communication network between remote computers. For example, one such computer communication network comprises a central Synchronism Transmitter Receiver (STR) unit and a plurality of remote STR units. Frequently, the STR units are provided with privacy circuits for encoding and decoding the messages transmitted therebetween. Generally, each privacy circuit is equipped with a crystal oscillator for maintaining synchronism with the remaining privacy units associated with remote STR units. The receive oscillator must operate on the exact same frequency as the transmitter oscillator to decode the received message. After establishing synchronism between all the STR units in a network, the units stay synchronized whether or not the data lines between units remained connected. Obviously, the duration of the synchronism between units depends on the stability of each individual crystal oscillator and the similarity of change between units, if such a change does occur in each of the oscillators. The continued synchronous operation between all the STR units and all privacy devices is desirable, since, although synchronizing the privacy devices requires only a short time, it requires manual intervention at all the remote locations in addition to the central transmission station.

Since it is presently impossible to construct crystal oscillators which maintain an absolute constant frequency, it is necessary to determine the required operating characteristics of a communications network and then devise a system to achieve these characteristics. The STR unit described in the aforementioned patent application operates at a basic oscillator frequency of 921.6 kc. Therefore, in order to maintain synchronous operation after a two hour break in the data lines between a pair of STR units, the frequency deviation must be less than 360 cycles.

However, in an attempt to instrument a system which must maintain such a low frequency change, it is necessary to employ an oscillator having a frequency drift of no more than five parts in $10^8$ cycles per second (c.p.s.) over a two-week period. Even with oscillators of such accuracy, the following problems exist. Theoretically, the frequency of the remote oscillator must be matched every two weeks to the exact frequency of the oscillator at the central station. Second, unless the assumption is made that any drift in the oscillator at the central station is in the same frequency direction e.g., all increase in frequency, as the oscillator frequency in the remote stations, the matching operation must be more frequent. Third, measurement of the frequency difference between any two oscillators is difficult, if not impossible to the degree required. Fourth, as the frequency rate of similar communications network increases, the oscillator stability must also increase correspondingly if the same two week requirement and 360 c.p.s. deviation per two hours is to remain constant. Fifth, loss of power to the remote oscillator causes a major frequency shift. This frequency shift is as much as 144 cycles or a major portion of the frequency deviation allocated to an entire two-hour period. Sixth, an oscillator of this type is not a standard item and its cost prohibits its use.

The instant invention provides continuous synchronism between a central and a remote oscillator which begin operation having a frequency offset of 0.1 c.p.s. It automatically corrects the frequency difference between the two oscillators and provides a perfect frequency match in less than ten hours. Maintenance of this improved frequency control circuit is only necessary when the limit of automatic adjustment is approached. The stability of the oscillator employed in the instant invention need be only one cycle in $10^6$ cycles per week. In a communications network equipped with the instant invention, the direction of frequency deviation between the central and remote oscillator is immaterial. Finally, after a power failure, a perfect frequency match is achieved in approximately two hours.

Accordingly, it is an object of the instant invention to provide a frequency correction system which enables distant communication stations to remain continuously in synchronism.

It is another object of the instant invention to provide a frequency correction system which maintains a minimum frequency deviation between the frequency of a remote oscillator and a master oscillator.

It is still a further object of the instant invention to provide a frequency correction system which continuously monitors the frequency difference between a transmitting and receiving station, but which initiates operation only after sensing a minimum frequency change.

It is a further object of the instant invention to provide a frequency correction system which is extremely accurate in sensing very small frequency deviations between a pair of oscillators.

According to these objects, the instant invention operates in combination with a Synchronous Transmitter Receiver unit employing a phase comparator, which comparator operates to locate the center of each incoming data bit by the use of a sampling strobe pulse. A displacement between the strobe pulse and the center of a received data bit causes the phase comparator to generate an advance pulse or a retard pulse depending on the direction of frequency deviation. Additionally, the instant invention employs circuitry to count these retard and advance pulses, which pulses thereafter control a reversible motor for adjusting a tuning capacitor or other variable reactance in the local oscillator circuit.

The foregoing and other objects, features and advantages of the invention will be apparent from the following more particular description of a preferred embodiment of the invention, as illustrated in the accompanying drawings; wherein FIG. 1 is a generalized block diagram of the instant invention;

Standard circuits are not described in detail but are only identified by name throughout the description of the instant invention.

Figure 1:
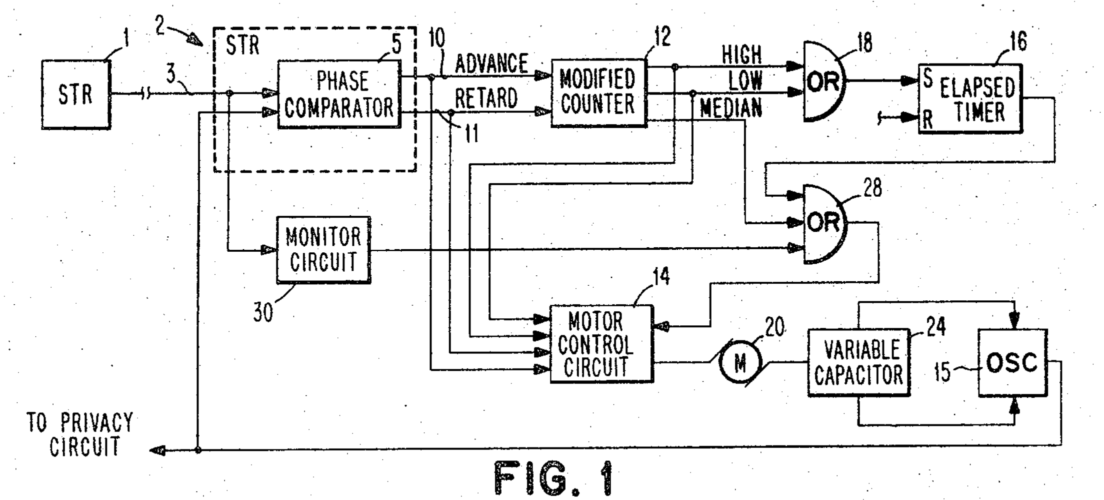

Referring to FIG. 1, a pair of STR units 1 and 2 are shown connected by a transmission medium 3. The receiving STR unit 2 includes a phase comparator 5 which generates an advance and a retard output signal on lines 10 and 11 respectively. A complete description of the comparator 5 is found in the aforementioned patent and is shown in FIGS. 3 through 8. The advance and retard pulses generated in the comparator 5 are applied to a modified reversible counter 12 where they are counted and to a motor control circuit 14 where they operate as enabling signals.

The counter 12 is originally set to hold a number intermediate its minimum and maximum positions. Advance pulses from the comparator 5 indicate that the frequency from an oscillator 15 is lower than the frequency of the received data and cause the counter to advance towards its maximum position. Retard pulses from the comparator 5 indicate that the frequency from the oscillator 15 is higher than the frequency of the received data and cause the counter 12 to reduce its count toward its minimum position. For the purposes of this description, the modified counter 12 comprises a four stage counter having a maximum binary count of fifteen. The binary count of eight is assigned as the median position, the binary count of one is assigned as the low or minimum position, and the binary count of fifteen is assigned as the high or maximum position. The binary count of zero is disregarded thereby giving an equal count to the high or low position from the median position.

The counter 12 generates a high or a low output signal by means of decode circuits 46 and 62 whenever the counter reaches a high or a low position despectively, and applies these signals to an elapsed timer 16 by an "OR" gate 18 and directly to the motor control circuit 14. The motor control circuit 14 activates a reversible motor 20 and causes it to turn in either a clockwise or counter clockwise direction upon the receipt of a retard or advance pulse respectively from the counter 12. The motor 20 adjusts a variable capacitor 24 which is connected across the oscillator 15, thereby making an appropriate change to the frequency output of the oscillator 15.

The elapsed timer 16 is set to measure a specified time whenever it receives either a high or low output signal from the counter 12. A suitable timer is that identified as Model A2324A3 manufactured by the Haydon Co. Upon the generation of either a high or low output signal by the counter 12, each additional advance or retard pulse restores the timer 16 to its start condition. If no additional advance or retard signals are received to restore the timer 16, the timer 16 generates an output signal when the pre-set period elapses. This output signal turns off the motor 20 by an OR gate 28 and motor control circuit. 14.

The motor 20 is turned off under a second set of conditions. As previously mentioned, a low output signal from the counter decode circuit 62 turns on the motor and causes it to adjust the frequency of the oscillator downward. However, overcorrection of the oscillator output frequency is detected by the generation of a median signal from the counter 12. The median signal indicates that the comparator 5 is now generating advance pulses, which pulses indicate that the frequency of the oscillator 15 has changed from too high to too low. The detection of a median signal also indicates that the counter 12 has been counted from its low position back towards its high position. The median signal stops the motor and prevents additional overcorrection while the frequency difference is not too great. This signal is applied to the motor 20 by the OR gate 28 and the motor control circuit 14.

The OR gate 28 has a third input signal from a monitor circuit 30 which is connected to the transmission line 3. This circuit is activated by the absence of data pulses on the line 3, which absence is indicative of a break in the line. The monitor circuit may be a single shot multivibrator of standard construction which is disabled by the presence of data pulses on the line 3, but which is activated by the removal of these pulses.

Figure 2:
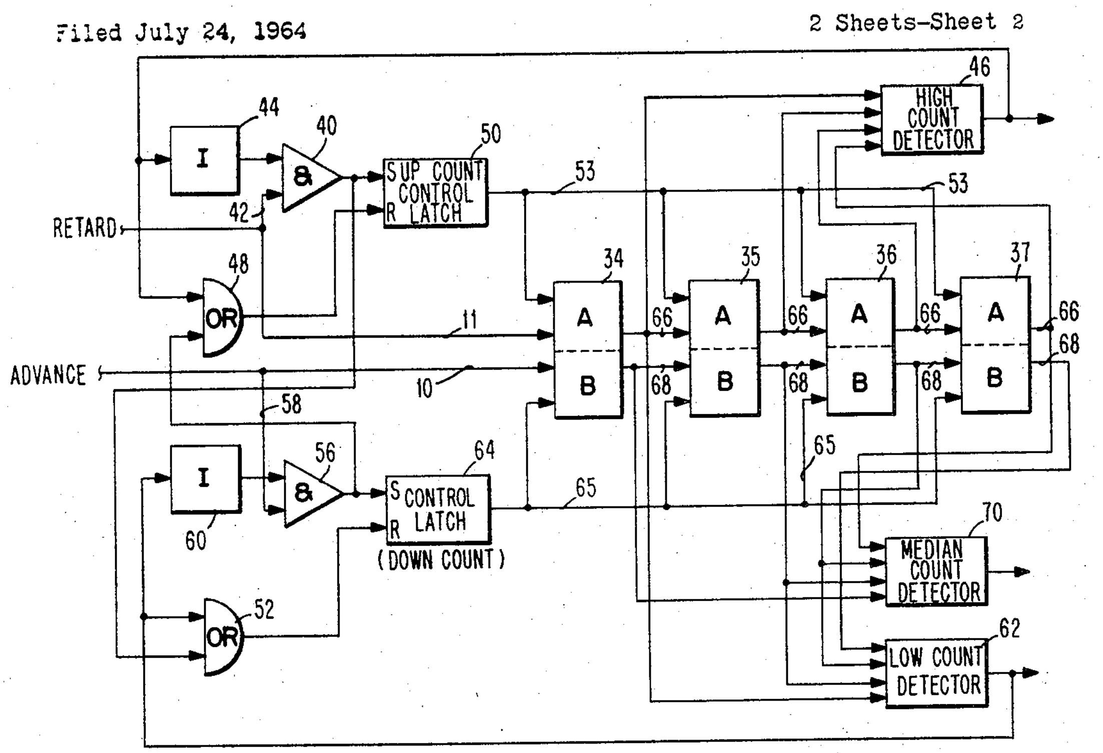
FIG. 2 is a more detailed block diagram of the counter circuit shown in FIG. 1.

Referring to FIG. 2, the modified counter 12 shown in FIG. 1 includes a plurality of stages 34 through 37. The retard signal from the comparator 5 is applied to the stage 34 by the line 11 and to an AND gate 40 by a line 42. The AND circuit 40 has a second input signal from an inverter circuit 44. The input to the inverter circuit is applied thereto by a high count detector or decode circuit 46. The output from the detector 46 is also applied to an OR gate 48. The output of the AND gate 40 is applied to an up count control latch 50 as a set pulse and to an OR gate 52. The output of the OR gate 48 is applied to the up count control latch 50 as a reset pulse. The output from the up count control latch 50 is applied to each of the counter stages 34 through 37 by a line 53. The counter stages 34 through 37 could be any bistable device such as a flip flop. However, a pair of triggers have been selected for use in the preferred embodiment and are further described and shown with reference to FIG. 3.

The advance signal from the comparator 5 is applied to the counter stage 34 by means of the line 10 and to an AND gate 56 by means of a line 58. The AND gate circuit 56 has a second input signal from an inverter 60. The inverter is driven by a low count detector or decode circuit 62. The low count detector 62 is also connected to the OR gate 52. The AND gate 56 is connected to the OR circuit 48 and is applied to a down count control latch 64 as a set signal. The output of the OR gate 52 is connected to the down control latch 64 as a reset signal. The output of the down count control latch 64 is applied to each of the trigger stages 34–37 by a line 65.

The output of each side of the counter stages 34–36 is applied to the next adjacent counter stage by an A side output line 66 and a B side output line 68 respectively. A more detailed description of the interconnection of adjacent counter stages is given in the discussion of FIG. 3. The final stage 37 is also equipped with an A side output line 66 and a B side output line 68. Each of the A side output lines from the stages 34 through 37 is connected to the high count detector or decode circuit 46. The low count detector or decode circuit 62 has four input signals; the first of which is from the A side of the stage 34 and the remaining of which are from the B side of the stages 35 through 37 respectively. A median count detector or decode circuit 70 has four input signals; the first of which is from the A side of the counter stage 37, and the remaining of which are from the B side of the stages 34 through 36. The detector circuits 46, 62 and 70 are standard AND gate circuits.

Figure 3:
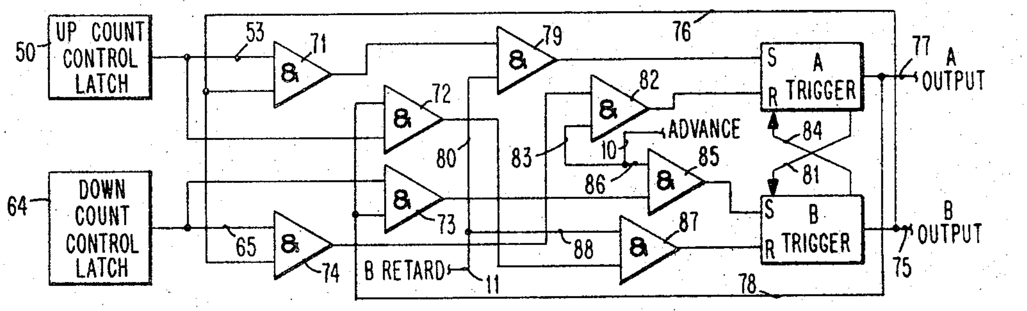
FIG. 3 is a more detailed block diagram of each counter stage shown in FIG. 2.

FIG. 3 shows a representative counter stage 34 being divided into a pair of standard triggers A and B, and shows in greater detail the input circuitry associated with each of the counter stages 34 through 37. The A and B triggers are equipped with a set and reset input terminals S and R respectively. The output from the up count control latch 50 is applied to a pair of AND gates 71 and 72 by the line 53. The output from the down control latch 64 is applied to a second pair of AND gates 73 and 74 by the line 65. The output signal from the B side of the counter stage 34 is available on an output line 75 and is applied to the AND gates 71 and 74 by a line 76. Additionally, the output signal from the A side of the counter stage 34 is available on an output line 77 and is applied to the AND gates 72 and 73 by a line 78. The output of the AND gate 71 is applied as an enabling signal to a set AND gate 79. The retard signals available on the line 11 are applied to the gate 79 by the line 11 and a line 80. The output signal from the gate 79 operates to set the A trigger to its ON condition whereby it furnishes an enabling output signal on its output line 77, and it generates a reset signal on its cross coupling line 81. The A trigger is reset by one of two reset signals, one of which is applied to the A trigger from a reset AND gate 82. The AND gate 82 has two input signals, one of which is the output signal from the AND gate 74, and the other of which is the advance signal applied thereto by the line 10 and a line 83.

The A trigger is also reset by a cross-coupling signal on a line 84, which signal is generated by the B trigger as further explained hereinafter. This cross-coupling technique is a standard reset practice and is identical to that used in standard flip-flop circuits.

The output from the AND gate 73 is applied to a second set AND gate 85 as an enabling signal. The gate 85 has a second input signal which is the advance signal applied thereto by the line 10 and a line 86. The output from the set AND gate 85 operates to set the B trigger to its ON condition whereby it furnishes an enabling signal on its output line 75, and it generates an A trigger reset pulse on its cross-coupling line 84. The output of the AND gate 72 is applied to a second reset AND gate 86 as an enabling signal. The gate 86 has a second input signal which is the retard signal applied thereto by the line 11 and a line 87. The output of the reset AND gate 86 is applied to the reset terminal of the B trigger causing it to furnish an inhibiting output signal on its output line 75 and to furnish a reset signal on its cross-coupling line 84.

Stages 35 through 37 are identical to stage 34 as described in FIG. 3 except for the following differences. Lines 80 and 87 are connected in common to line 75 of the preceding stage, and lines 83 and 86 are connected in common with line 77 of the preceding stage.

Figure 4:
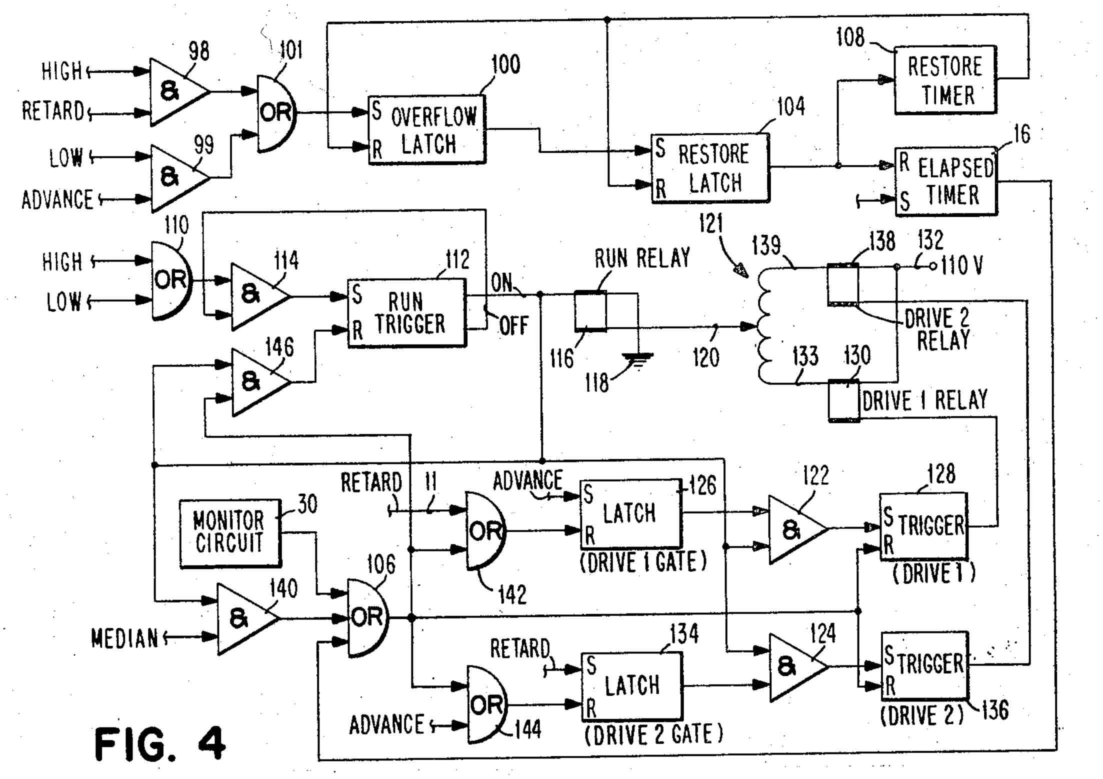
FIG. 4 is a more detailed block diagram of the motor control circuit shown in FIG. 1.

Referring to FIG. 4, the motor control circuit shown in FIG. 1 includes a pair of AND gates 98 and 99. The AND gate 98 has two input signals, one of which is the high count signal from the detector 46, shown in FIG. 2 and the other of which is the retard pulse generated by the phase comparator 5. The AND gate 99 has two input signals, one of which is the low count signal from the detector 62, and the other of which is the advance pulse generated by the phase comparator 5. The outputs from the AND gates 98 and 99 are applied to an overflow latch 100 by an OR gate 101, causing the latch 100 to generate an enabling output pulse. The output of the latch 100 sets a restore latch 104 to one of its stable conditions whereby its generates an enabling output signal for application to the elapsed timer 16.

The elapsed timer 16 need not be described in detail because its construction is well known. The timer normally remains in its zero as "timed-out" condition. Referring to FIG. 1, the application of a start pulse to the elapsed timer 16 from the OR gate 18 activates the elapsed timer. The timer 16 is set to measure a predetermined period of time. For the purpose of this description, a period of fifteen minutes has been selected. Whenever the timer 16 receives an input pulse from the restore latch 104, shown in FIG. 4, the timer is restored to its zero condition and renews its timing of the fifteen minute period. The timer 16 generates an output pulse upon reaching the end of the fifteen minute period, and it applies this output pulse to an OR gate 106 causing the motor control circuit to turn off or hereinafter described.

The output of the restore latch 104 is also applied to a restore timer 108. The restore timer 108 is interposed between the output of the restore latch 104 and the reset input terminal of the overflow latch 100 to assure the complete restoring of the timer 16 prior to resetting the latch 100.

An OR gate 110 has two input signals, one of which is a high count signal from the detector 46 shown in FIG. 2, and the other of which is a low count signal from the detector 62. The output from the OR gate 110 is applied to a run trigger 112 by an AND gate 114. The trigger 112 is of standard design and generates a pair of output signals which indicate when the trigger is "ON" or "OFF." The "OFF" output signal is applied as a second input to the AND gate 114. Therefore, the output of the OR gate 110 sets the trigger 112 to its "ON" condition whenever the trigger is "OFF." However, when the trigger is "ON" the AND gate 114 is disabled and the signal from the OR gate 110 is not applied to the trigger 112. The "ON" output of the trigger 112 is applied as the activation signal of a run relay 116, causing the relay to operate and to close its pair of contacts, not shown, connecting ground 118 to the center tape 120 of a motor coil 121.

The enabling output from the "ON" terminal of the trigger circuit 112 is also applied to a pair of AND gates 122 and 124. The AND gate 122 has a second input signal from a first drive gate latch 126. The latch 126 is of standard construction and generates an output signal for application to the AND gate 122 upon the reception of an advance signal, from the comparator 5, at its set input terminal. The output of the AND gate 122 is applied to the set input terminal of a drive trigger 128. The trigger 128 generates an enabling output pulse in response to this signal and applies its enabling signal to a first drive relay 130. The relay 130 energizes and closes a pair of its contacts, not shown, thereby making contact between a potential source 132 and one end 133 of the motor coil 121. A suitable potential source 132 may be at a positive 110 volt level. In this manner a portion of the motor coil 121 is connected between ground 118 and the potential source 132, and the motor 20 rotates in one direction, causing a decrease in the frequency from the oscillator 15.

The AND gate 124 has a second input signal from a second drive gate latch 134. The latch 134 is of standard construction and generates an enabling output pulse in response to a retard signal, from the comparator 5, applied to its set input terminal. The output of the AND gate 124 sets a second drive trigger 136 to one of its stable states whereby it generates an enabling output signal for application to a second drive relay 138. The drive relay 138 activates and closes two of its contacts, not shown, thereby completing a circuit between the potential source 132 and the other end 139 of the motor coil 121. In this manner, a portion of the motor coil 121 is connected between ground 118 and the potential source 132, and the motor 20 rotates in the other direction, causing an increase in the frequency from the oscillator 15.

An AND gate 140 has two input signals, one of which is the median count signal from the detector 70, and the other of which is the "ON" enabling output signal from the trigger 112. The output of the AND gate 140 is applied to the OR gate 106, which OR gate has a second input from the elapsed timer 16, and a third input from the monitor circuit 30. The output of the OR gate 106 is a reset signal, which operates to turn off the motor 20. The output of the OR gate 106 is applied to the reset terminal of the drive triggers 128 and 136, causing the triggers to return to their second stable state and to remove their output enabling signal from the drive relays 130 and 138 respectively. The output of the OR gate 106 is also applied as an input to a pair of OR gates 142 and 144. The OR gate 142 has a second input signal applied thereto from line 11 of the comparator 5. The output of the OR gate 142 is applied to the reset terminal of the first drive gate latch 126 causing it to return to its second stable state thereby removing its enabling output signal from the AND gate 122. The OR gate 144 has a second input signal from line 10 of the comparator 5. The output of the OR gate 144 is applied to the reset terminal of the second drive gate latch 134 causing it to return to its second stable state whereby it removes its output enabling signal from the AND gate 124.

The output of the OR gate 106 is applied to a reset AND gate 146, which gate has a second input signal applied thereto from the "ON" output terminal of the run trigger 112. Therefore, when the trigger is "ON," it can be reset by the output signal from the OR gate 106.

Figure 5:
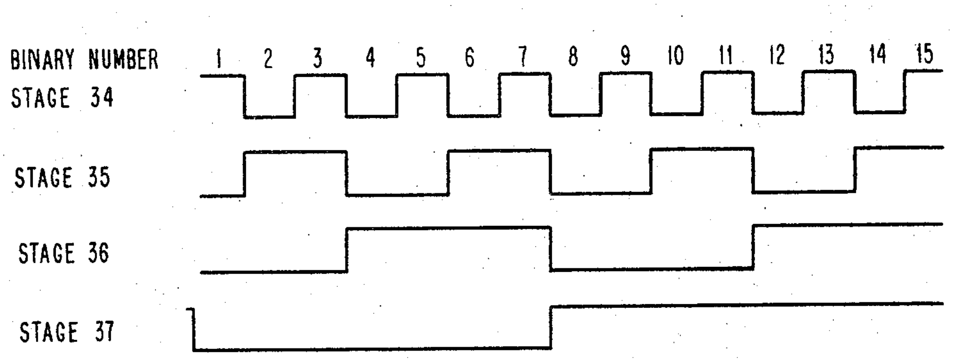
FIG. 5 shows the output waveforms associated with each counter stage as shown in FIG. 2.

FIG. 5 shows the output waveforms associated with the A side of each counter stage 34–37. The median count position of the counter 12 is shown in FIG. 5 as the binary eight position. That is, the A side of stages 34–36 are at their "zero" or negative level and the A side of stage 37 at its "one" or positive level. Assuming for the purpose of this description that the frequency of the oscillator circuit begins to increase in comparison with the frequency of the incoming data, the comparator 5 generates a first retard signal upon the comparison of the oscillator frequency and the data frequency as described in the aforementioned patent application. The first retard signal is applied to the AND gate 40 and the drive gate latch 134 shown in FIGS. 2 and 4 respectively. The AND gate 40 is enabled by a signal from the inverter 44. The output from the AND gate 40 sets the up-count control latch 50 in its first stable state, whereby it generates an enabling output pulse for application to the stages 34–37 over the line 53, as shown in greater detail in FIG. 3. The retard pulse applied to the drive gate latch 134 sets the latch to its first stable state, whereby it generates an enabling output pulse for application to the AND gate 124.

The second retard pulse is applied to the AND gates 79 and 86 as shown in FIG. 3. The AND gate 71 is enabled by the simultaneous application thereto of the enabling output signals on lines 53 and 76 respectively. The output of the AND gate 71 is applied to the AND gate 79 as an enabling signal for passing the second retard pulse therethrough and setting the A trigger to its first stable state, wherein it generates a positive output signal on the line 77. Additionally, the A trigger generates a reset signal on its cross-coupling line 81 for resetting the B trigger to its second stable state. Referring again to FIG. 5, there can be seen that this second retard pulse has increased the binary count of the counter 12 to a binary nine position.

Since the output of the A trigger on line 77 is now positive, it enables the AND gates 72 and 73. The AND gate 72 is also enabled by the output signal of the count latch 50, causing the AND gate 72 to apply its own enabling output signal to the AND gate 86. The third retard pulse passes through the AND gate 86 and sets the B trigger to its first stable stage whereby it generates an enabling output signal on its output line 75. Additionally, the B trigger generates a reset pulse on its cross-coupling line 84 for resetting the A trigger to its second stable state. Simultaneously, the output signal of the B trigger of stage 34 is applied to line 80 of the counter stage 35 and sets the A trigger of stage 35 into its first stable state in the same manner as the second retard signal sets the A trigger of the stage 34 into its first stable state.

Therefore, by referring to FIG. 5, there it can be seen that the modified counter has been advanced to its binary ten condition by setting the A trigger of stages 34 and 35 to their second and first stable states respectively. Additional retard pulses continue to advance the modified counter until the binary count of fifteen is reached. At this time, the high count detector is activated and disables the AND gate 40 by removing its enabling signal. This prevents the overdriving of the counter 12.

The high count output signal starts the elapsed timer as shown in FIG. 1 and sets the run trigger 112, shown in FIG. 4, to its first stable state, whereby it generates an enabling signal at its "ON" output terminal. This enabling signal activates the relay 116 causing ground potential 118 to be connected to the center tap 120 of the motor coil 121. The output of the run trigger is also applied to the set terminal of the drive trigger 136 through the previously enabled AND gate 124. The drive trigger energizes the drive relay 138 causing the application of 110 volts to the upper side 139 of the motor coil 121.

Since the coil 121 of the motor 20 is connected across 110 volts, the motor 20 rotates in one direction and adjusts the variable capacitor 24, connected thereto, so as to reduce the frequency output of the oscillator 15. However, the rate of frequency correction is very slow therefore it is possible to receive additional retard pulses after the initial energization of the motor 20. The additional retard pulses are applied to the overflow latch 100 and operate to restore the maximum timing period of the timer 16. In this manner, the motor 20 continues to adjust downward the output frequency of the oscillator 15 until a 15 minute period elapses without the application of a single retard pulse. At the end of this 15 minute period, the elapse timer 16 generates an output signal for turning off the motor 20 by resetting the drive trigger 136.

However, for the purpose of this discussion, it will be assumed that the motor 20 has overcorrected the frequency from the oscillator 15 and before the 15 minute period has elapsed, the comparator 5 begins to generate advance pulses. These advance pulses indicate that the output of the oscillator 15 has been reduced too far and needs countercorrection. The first advance pulse from the comparator 5 is applied to the AND gate 56, the drive gate latch 126 and the OR gate 144. The OR gate 144 resets the latch 134 so as to remove its output enabling signal from the AND gate 124. The advance pulse applied to the latch 126 sets it in a manner similar to that previously described for the setting of latch 134. The first advance pulse sets the down-count control latch 64 to its first stable position whereby it generates an enabling output pulse for application to the B side of the triggers 34–37. The second advance pulse is applied to the AND gates 82 and 85 shown in FIG. 3. The AND gate 85 receives its enabling signal from the AND gate 73. The AND gate 73 has two enabling signals; one of which is from the down-count control latch 64 and the other of which is from the output of the A trigger. The output of the AND gate 85 sets the B trigger to its first stabling condition whereby it generates a positive pulse on its output line 75 and a cross-coupling pulse on its cross-coupling line 84, resetting the A trigger to its second stable condition.

Referring to FIG. 5, there can be seen that the first advance pulse has reduced the count of the modified counter to its binary position fourteen. In a similar manner, additional advance pulses continue to reduce the count of the modified counter 12. Upon reaching the median condition as detected by the detector 70, the run trigger 112, shown in FIG. 4, is reset by the operation of the OR gate 106 and the AND gate 146 thereby disengaging the run relay 116. The output of the OR gate 106 also resets the drive trigger 136 thereby disengaging the 110 volt source 132 from the upper end of the motor coil 121.

Additional advance pulses continue to decrease the count of the modified counter 12 until it has been recounted to its minimum condition. At this time, the low count detector 62 generates a low output signal for application to the elapsed timer 16 and to the OR gate 110. The run trigger again energizes the run relay 116 and the drive relay 130 by means of the drive trigger 128. The motor 20 now rotates in a counterclockwise direction and rotates the tuning capacitor 24 connected thereto in order to reduce the frequency from the oscillator 15.

Repeated correction cycles in each direction is a hunting operation whereby the exact frequency is achieved by several correction signals.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data transmission system employing a transmitting and a receiving station connected by a data transmission medium carrying data signals, and each receiving station being equipped with a local oscillator for generating basic timing pulses, a tuning reactance for modifying the frequency of the local oscillator, and a reversible motor for adjusting the tuning reactance, a frequency corrector comprising:

- a compare circuit responsive to said data signals and said basic timing pulses for generating signals indicating a deviation between the center of a received data signal and a timing pulse,
- a counter responsive to said compare circuit for counting said deviation indicating signals,
- decode circuits responsve to said counter for generating output signals representing the attainment of first and second specified counts, and
- means responsive to said decode output signals and connected to the reversible motor for activating the motor on attainment of said specified counts whereby, the reactance is adjusted with an attendant change in local oscillator frequency causing a frequency match with the incoming data signals.

2. In a data transmission system employing a transmitting and a receiving station connected by a data transmission medium over which data signals are passing, and each receiving station being equipped with a local oscillator for furnishing basic timing pulses, a tuning reactance for modifying the frequency of the local oscillator, and a reversible motor for adjusting the tuning reactance, a frequency corrector comprising:

- a compare circuit responsive to said transmitted signals and said basic timing pulse for generating signals indicating a deviation between the center of a received data signal and a timing pulse,
- a counter responsive to said compare circuit for counting said deviation indicating signals,
- a decode circuit responsive to said counter for generating an output signal indicating the attainment of a specified count,
- means responsive to said output signal of said decode circuit and connected to the reversible motor for activating the motor upon reaching said specified count,
- an elapsed timer responsive to said decode circuit output signal for starting the measurement of a specified period of time and for deactivating the motor after said specified period, and means responsive to additional deviation indicating signals for restoring said elapsed timer to its starting position.

3. A frequency corrector as recited in claim 1, wherein the motor further includes a motor coil having a tap intermediate its ends, and said motor activating means comprises:

- a first trigger responsive to said decode output signal for generating a first enabling output signal,
- a first potential source and a second potential source,
- a first relay responsive to said enabling output signal for connecting the tap to said first potential source,
- a latch responsive to said deviation indicating signal for generating a second enabling output signal,
- a second trigger responsive to the concurrent application of said first and second enabling output signals for generating a third enabling output signal, and
- a second relay responsive to said third enabling output signal for connecting one end of the motor coil to said second potential source, whereby the motor rotates in one direction thereby adjusting the tuning reactance to match the local oscillator frequency with the received data signals.

4. A frequency corrector as recited in claim 2, wherein said restoring means comprises:

- a first latch having a set condition and a reset condition and responsive to the concurrent application of said deviation indicating signal and said decode output signal for generating a set signal,
- a second latch having a set condition and a reset condition and responsive to said set signal for generating a restore signal for restoring said timer, and
- a restore timer responsive to said restore signal for resetting said first and second latches.

5. In a data transmission system employing a transmitting and receiving station connected by a data transmission medium over which data signals are passing, and each receiving station being equipped with a local oscillator for furnishing basic timing pulses, a tuning reactance for modifying the frequency of the local oscillator, and a reversible motor for adjusting the tuning reactance, a frequency corrector comprising:

- a compare circuit responsive to said transmitted signals and said basic timing pulses for generating signals indicating a deviation between the center of a received data signal and a timing pulse,
- said deviation indicating signals including a retard signal indicating that the local oscillator frequency is higher than the received signal and an advance signal indicating that the local oscillator frequency is lower than the received signal,
- a bidirectional counter having maximum and minimum significant positions and responsive to said compare circuit for counting said retard and advance signals,
- said counter being initially set to some position intermediate said minimum and maximum positions,
- said advance signals being operative to advance said counter towards its maximum position and said retard signals being operative to reduce said counter from its maximum position towards its intermediate position,
- a decode circuit responsibe to said counter for generating an output signal indicating the attainment of said maximum and said intermediate positions,
- means responsive to said maximum decode signal for activating said motor,
- an elapsed timer responsive to said maximum decode output signal for starting the measurement of a specified period of time and for deactivating the motor after said specified period, and
- said motor activating means being further responsive to said intermediate decode output signal for deactivating said motor prior to the elapsing of said specified period, whereby the motor ceases its adjustment of said tuning reactance before overadjustment occurs.

6. A frequency corrector as recited in claim 5, wherein the motor further includes a motor coil having a tap intermediate its ends, and said activating and deactivating means comprises:

- a first, run, trigger having a set condition and a reset condition and being responsive to said maximum decode output signal for generating a first set signal,
- a first potential source and a second potential source,
- a first, run, relay responsive to said set signal for connecting the tap to said first potential source,
- a drive 1 gate latch having a set condition and a reset condition and being responsive to said advance signal for generating a first enabling output signal,
- a second, drive 1, trigger having a set condition and a reset condition and being responsive to the concurrent application of said set signal and said first enabling signal for generating a second enabling output signal,
- a second, drive 1, relay responsive to said second enabling output signal for connecting one end of the motor coil to said second potential source, and means for applying said intermediate decode signal to said first and second triggers and said latch for resetting said latch and triggers, whereby said relays are de-energized thereby disconnecting said motor coil from said potential sources and stopping said motor.

7. In a data transmission system employing a transmitting and receiving station connected by a data transmission medium over which data signals are passing, and each receiving station being equipped with a local oscillator for furnishing basic timing pulses, a tuning reactance for modifying the frequency of the local oscillator, and a reversible motor for adjusting the tuning reactance, a frequency corrector comprising:

a compare circuit responsive to said transmitted signals and said basic timing pulses for generating signals indicating a deviation between the center of a received data signal and a timing pulse, said deviation indicating signals including a retard signal indicating that the local oscillator frequency is higher than the received signal and an advance signal indicating that the local oscillator frequency is lower than the received signal, a bidirectional counter having maximum, median, and minimum positions and responsive to said compare circuit for counting said advance and retard signals, said counter being initially set to said median position, said advance signals being operative to advance said counter towards its maximum position and said retard signals being operative to decrement said counter towards its minimum position, a decode circuit responsive to said counter for generating output signals indicating the attainment of each of said maximum, median and minimum positions, means responsive to said maximum and minimum decode signals for activating said motor in opposite directions respectively, and an elapsed timer responsive to said maximum and minimum decode output signals for starting the measurement of a specified period of time and for deactivating the motor after said specified period.

8. In a data transmission system employing a transmitting and receiving station connected by a data transmission medium over which data signals are passing, and each receiving station being equipped with a local oscillator for generating a plurality of timing pulses, a tuning reactance for modifying the frequency of the local oscillator, and a reversible motor for adjusting the tuning reactance, a frequency corrector comprising:

a compare circuit responsive to said transmitted signals and said basic timing pulses for generating signals indicating a deviation between the center of a received data signal and a timing pulse, said deviation indicating signals including a retard signal indicating that the local oscillator frequency is higher than the received signal and an advance signal indicating that the local oscillator frequency is lower than the received signal, a bidirectional counter having maximum, median, and minimum significant positions and responsive to said compare circuit for counting said advance and retard signals, said counter being initially set to said median position, said advance signals being operative to advance said counter towards its maximum position and said retard signals being operative to reduce said counter towards its minimum position, a decode circuit responsive to said counter for generating an output signal indicating the attainment of each of said significant counter positions, first means responsive to said maximum decode signal for activating said motor to turn in one direction, second means responsive to said minimum decode signal for activating said motor to turn in the opposite direction, an elapsed timer responsive to said maximum and minimum decode output signals for starting the measurement of a specified period of time and for deactivating the motor after said specified period, and third means responsive to said median decode output signal for turning off said motor prior to the elapsing of said specified period of time, whereby, the motor ceases its adjustment of said tuning reactance before performing too great an adjustment.

9. A frequency corrector as recited in claim 8, wherein the reversible motor further includes a motor coil having a tap intermediate its ends, and said first means comprises:

a first, run, trigger having a set condition and a reset condition and being responsive to said maximum decode signal for generating a set signal, a first potential source and a second potential source, a first, run, relay responsive to said set signal for connecting the tap to said first potential source, a first, drive 1 gate, latch having a set condition and a reset condition and being responsive to said advance signal for generating a first enabling output signal, a second, drive 1, trigger having a set condition and a reset condition and being responsive to the concurrent application of said set signal and said first enabling signal for generating a second enabling output signal, and a second, drive 1, relay responsive to said second enabling signal for connecting one end of the motor coil to said second potential source, whereby the motor rotates in one direction causing the frequency of the local oscillator to increase.

10. A frequency corrector as recited in claim 9, wherein said second means comprises:

said first, run, trigger being additionally responsive to said minimum decode signal for generating a set signal, said first, run, relay being responsive to said last mentioned set signal for connecting the tap to said first potential source, a second, drive 2 gate, latch having a set condition and a reset condition and being responsive to said retard signal for generating a third enabling output signal, a third, drive 2, trigger having a set condition and a reset condition and being responsive to the concurrent application of said last mentioned set signal and said third enabling signal for generating a fourth enabling signal, and a third, drive 2, relay responsive to said fourth enabling signal for connecting the other end of the motor coil to said second potential source, whereby the motor rotates in the opposite direction from said first mentioned direction causing the frequency of the local oscillator to decrease.

References Cited

UNITED STATES PATENTS

| | | | |
|---|---|---|---|
| 2,881,321 | 4/1959 | Daukshers et al. | 331—35 XR |
| 3,142,802 | 7/1964 | Maure | 178—69.5 XR |
| 3,185,963 | 5/1965 | Peterson et al. | 178—69.5 XR |

ROBERT L. GRIFFIN, *Primary Examiner.*

R. L. RICHARDSON, *Assistant Examiner.*